3,384,135
GUIDE MEANS FOR SAWS
Arthur J. Frydenlund, 533 N. Marquette Road,
Prairie du Chien, Wis. 53821
Filed July 1, 1966, Ser. No. 562,250
12 Claims. (Cl. 143—6)

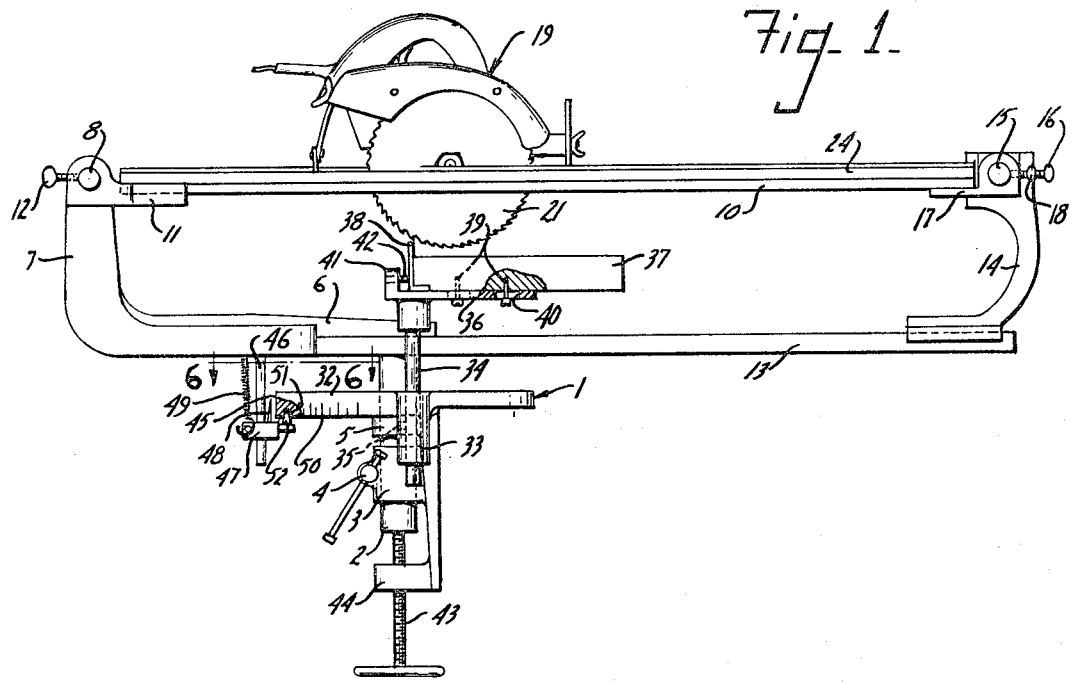

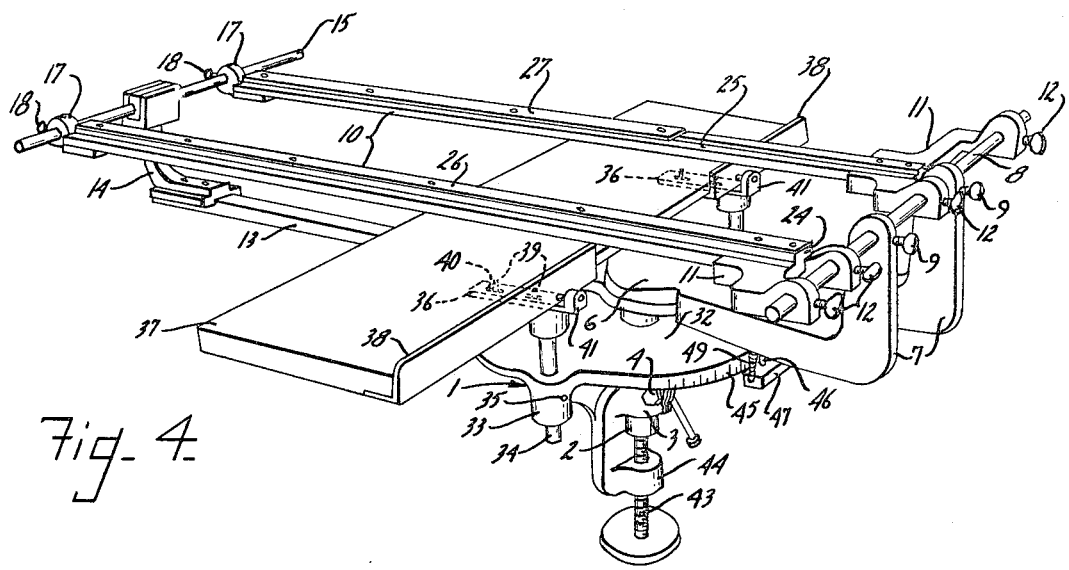

This invention relates to an improved guide means for saws, and more particularly to an improvement over the guide disclosed and claimed in my prior patent 2,903,026, issued Sept. 8, 1959.

As in my prior patent, the invention is directed to a mitre-guide for portable skillsaws and the like. It contemplates the use of a stabilizing member for supporting the guide rails at their rear ends, as well as vertical and horizontal adjustment of the work support. In addition, the skillsaw support comprises a preferably square plate having means thereon for clamping to the guide rails. The rails are constructed to provide channels for receipt of the saw support. Furthermore, the angle indicator is of improved construction, with means provided to set and hold the angle desired.

The accompanying drawings illustrate the best mode presently contemplated by the inventor for carrying out the invention.

In the drawings:

FIGURE 1 is a side elevation of the guide of the invention, with a skillsaw mounted thereon;

FIG. 2 is a top plan view of the guide and saw of FIGURE 1, with the device set for sawing at an angle;

FIG. 3 is a view similar to FIG. 2 with the saw turned 90° for ripping;

FIG. 4 is a perspective front view of the guides;

FIG. 5 is a section taken on line 5—5 of FIG. 3;

FIG. 6 is a view taken on line 6—6 of FIGURE 1; and

FIG. 7 is a fragmentary view of the work table adjusting means.

As shown in the drawings, the guide of the invention is adapted to be attached to a suitable workbench, not shown. The guide includes a frame 1 of cast metal or other suitable material which can be mounted on the workbench. Frame 1 is adapted to support a vertically extending pivot shaft 2. For this purpose, a split bearing 3 on the frame receives the lower end of the shaft, and has thereon suitable means to clamp the shaft to the frame, such as a tightening screwn device 4. Frame 1 also includes a closed bearing 5 disposed coaxially and above bearing 3 for recept of shaft 2 therethrough.

The upper end of shaft 2 carries a forwardly extending arm member 6 which diverges into a yoke having a pair of divergent L-shaped arms 7 having forwardly extending horizontal portions and upwardly extending vertical portions. The upper ends of yoke arms 7 are provided with aligned openings to permit receipt therethrough of a transverse rod 8. Rod 8 may be adjustably clamped to arms 7 as by tightening screws 9.

Rod 8 is designed to support the front end portions of a pair of parallel longitudinally extending saw guide rails 10. For this purpose, the front end of each rail is provided with a generally U-shaped bracket 11 with forwardly extending arms having aligned openings through which rod 8 passes. The bracket arms are spaced transversely to substantially prevent any tendency of rails 10 to twist about rod 8, and the rails are thus maintained in parallelism.

Rails 10 may be pivoted vertically about rod 8 and may also be adjusted transversely thereon to adjust for saws of different sizes. When desired, tightening screws 12 on brackets 11 can be used to secure rails 10 to the rod.

The upper end of pivot shaft 2 also carries a rearwardly extending stabilizing bar 13 which is disposed parallel to and generally between rails 10 and beneath the level of the rails. Bar 13 terminates slightly rearwardly of the rear ends of rails 10 and has a slightly forwardly extending and vertical arcuate arm 14 thereon. Arm 14 is provided with an opening through which extends a transverse rear support rod 15 which is parallel to rod 8 and in the same horizontal plane. A tightening screw 16 clamps rod 15 to arm 14.

A bracket 17 is secured to the rear end of each guide rail 10, with each bracket having an opening therein for mounting on rear rod 15. Rails 10 are thus adjustable on rod 15, with tightening screws 18 serving to clamp the rails to the rod.

Rails 10 are adapted to guidingly support a skillsaw 19 of the usual type having a motor housing 20 and rotary saw blade 21 extending downwardly therefrom. A relatively thin flat plate 22 is mounted on housing 20 and adapted to support the saw on rails 10. Plate 22 has four straight edges and is preferably square so that no rail adjustment is necessary when turning the saw 90° between cutting and ripping positions. An opening 23 in plate 22 receives saw blade 21 therethrough.

Each guide rail 10 is provided with a centrally disposed longitudinal flange 24 which guides saw 19 as it is slid along the inner horizontal rail surfaces 25. In addition, means are provided to keep saw plate 22 in contact with the rails. For this purpose, longitudinal plates 26 and 27 are secured to the upper surfaces of each flange 24, with the plate edges overhanging the adjacent rail surface 25 to form a confining channel. The plate 26 on one rail preferably extends the full length of the rail, while the plate 27 on the other rail terminates short of one rail end so that the confining channel is shortened. Thus, one edge of a skillsaw base plate 22 may be inserted into the longer channel, while the opposite edge is set down onto the surface 25 beyond the end of the shorter plate 27. As soon as the saw is slid rearwardly, the opposite longitudinal edges of the saw plate will be confined by the opposing channels.

During cutting, saw 19 must be free to move on rails 10. However, when the saw is turned 90° for ripping, as shown in FIG. 3, it is preferable to lock the saw in place. For this purpose, clamp means are provided on plate 22 for screwing the saw to the rails. In the present embodiment, and as best shown in FIG. 5, the clamp means comprises a spring steel plate 28 disposed at two adjacent corners of saw plate 22. Each plate 28 is generally circular and the diameter of the circular portion thereof is such that it does not interfere with rails 10. Each plate is mounted on a bolt 29 extending upwardly through plate 22, and is provided with a pair of radial projections 30 which may be placed over the rail flange plate 26 by turning plate 28. A wing nut 31 on bolt 29 can then be used to tighten plate 28 onto plate 26.

Returning to the front portion of the device, frame 1 includes a generally flat portion 32 directly above shaft bearing 5. Disposed outwardly from each side of member 32 is a vertical bracket 33 adapted to receive a pin 34, which can be locked in vertical position by a set screw 35. A horizontal arm 36 is carried by the upper end of each pin 34, with the pair of arms supporting a work support 37 having the usual workstop flange 38.

Work support 37 is secured to arms 36 as by screws 39, and is adjustable longitudinally relative to guide rails 10. For this purpose, arms 36 are provided with longitudinally extending slots 40 through which screws 39 extend. Each arm 36 has an upwardly extending flange 41 on its forward end, and an adjustment screw 42 extends through each flange and engages work stop. See FIG. 7. Work support 37 is thus adjustable both vertically (via pins 34 and set screws 35) and longitudinally (via slots 40).

In addition, guide rails 10 are adjustable vertically. For this purpose, a vertical turn screw 43 is threaded into a bracket 44 on frame 1 below split bearing 3. Screw 43 supports shaft 2 and may be turned to vertically adjust the shaft and everything mounted thereon.

Rails 10 and stabalizing bar 13 are adjustable about the axis of shaft 2. It is desirable that the angle of adjustment be known. For this purpose, flat portion 32 of frame 1 is provided with a curved front face 45 having angle gradations thereon. A thin rod 46 extends downwardly from each yoke arm 7, and a block 47 is slideably mounted on the rods and extends therebetween. A pointed member 48 is connected to block 47 and extends rearwardly beneath face 45 for indicating the angle of the guide rails.

Means are provided to maintain block 47 adjacent face 45. For this purpose, a pair of springs 49 are secured at their lower ends to block 47, and extend upwardly for connection at their upper ends to the respective yoke arm 7. Spring 49 thus biases block 47 so that pointer 48 approaches engagement with the lower side 50 of flat portion 32.

In some instances it is desirable to lock guide rails 10 at a desired angle. This is accomplished by providing a plurality of openings 51 in lower side 50, as shown in FIG. 6. Openings 49 are arcuately disposed and are adapted to receive an upwardly extending tapered projection 52 connected to block 47. As shown, openings 51 are disposed only at the 45° and 90° positions, although other openings could be provided inbetween. Projection 52 may be selectively removed from any opening by manually pushing down on block 47 against the biasing force of springs 49.

The present invention provides a substantially improved guide means for saws. Great flexibility is possible, due to the numerous means for adjusting the guide rails and work support. When the skillsaw base plate is square, it can be mounted on the guide rails in different positions without the need for adjusting the latter.

Various modes of carrying out the invention are contemplated as being within the scope of the following claims particularly pointing out and distinctly claiming the subject matter which is regarded as the invention.

I claim:

1. In a mitre-guide for saws, the combination comprising:
   (a) a frame,
   (b) a pair of saw guide rails,
   (c) means mounting said rails to said frame,
   (d) said mounting means being constructed to permit horizontal pivotal movement of said rails relative to said frame,
   (e) means on said frame for adjusting said rails vertically relative to said frame,
   (f) a work support,
   (g) and means mounting said work support to said frame,
   (h) said last-named mounting means including:
      (1) means for adjusting said work support vertically relative to said rails,
      (2) and means for adjusting said work support horizontally relative to said rails.

2. The mitre-guide of claim 1 in which said first-named mounting means (c) includes:
   (a) a vertical shaft secured to said frame,
   (b) a forwardly extending yoke carried by said shaft and with said yoke having a plurality of arms,
   (c) means mounting the forward ends of said rails to said yoke,
   (d) a rearwardly extending stabalizing bar carried by said shaft,
   (e) and means mounting the rearward ends of said rails to said bar.

3. The mitre-guide of claim 1 which is for use with a saw having a base plate with straight opposing edges, and which includes:
   (a) a channel on each rail for receiving said base plate edges to hold the saw in place,
   (b) the channel on one of said rails being shorter than that on the other rail to permit mounting on and removal of the saw from said rails.

4. The mitre-guide of claim 3 in which each said channel is formed by a longitudinal member overhanging the inner horizontal rail surface.

5. The mitre-guide of claim 1 which includes:
   (a) a flat member forming part of said frame,
   (b) said flat member having a curved face with angle andicia thereon,
   (c) pointer means suspended from said yoke for use in conjunction with said indicia,
   (d) and means biasing said pointer means toward said flat member.

6. The mitre-guide of claim 5:
   (a) wherein said flat member is provided with a plurality of arcuately disposed openings adjacent said face,
   (b) and wherein a projection is connected to said yoke and disposed for entry into a selected opening to lock said yoke at a desired angle.

7. The mitre-guide of claim 1 which includes in the combination:
   (a) a saw adapted to be mounted on said guide rails for sliding longitudinal movement thereon during cutting operations,
   (b) a saw base adapted to engage said rails,
   (c) said base comprising a square plate which permits turning of said saw 90° on said rails without the need for rail adjustment,
   (d) and means on said base plate for clamping the saw to the rails when the saw is in position for ripping.

8. The mitre-guide of claim 1;
   (a) in which said work support mounting means comprises a pair of arms disposed in supporting relation to said work support with said arms having upwardly extending flanges forwardly of the support.
   (b) and said work support adjusting means comprises:
      (1) slot means in said work support and disposed above said arms,
      (2) screw means extending upwardly from said arms into said slots,
      (3) and screw means extending through said flanges into engagement with said work support.

9. In a mitre-guide for saws, the combination comprising:
   (a) a frame,
   (b) a vertical shaft rotably mounted in said frame,
   (c) a forwardly extending yoke carried by said shaft,
   (d) a pair of parallel saw guide rails mounted at their forward ends on said yoke.
   (e) a saw having a square base plate with straight opposite edges,
   (f) a centrally disposed longitudinal flange extending along each said guide rail,
   (g) and a longitudinal plate mounted on each flange and overhanging the adjacent inner horizontal rail surface to form a guide channel for said base plate,
   (h) the longitudinal plate on one of said flanges being shorter than that on the other flange to permit mounting in and removal of the saw base plate from the channels.

10. The mitre-guide of claim 1 which includes:
    (a) a plurality of brackets on said frame,
    (b) a vertical pin extending through each bracket,
    (c) an arm carried by each said pin and disposed to support said work support,
    (d) means to clamp said pins in selected adjusted vertical positions,
    (e) and means for mounting said work support on said arms in selected adjusted horizontal positions.

11. The mitre-guide of claim 1 which includes:
(a) a flat horizontal member forming part of said frame,
(b) said flat member having a curved face with angle indicia thereon,
(c) a pair of rods suspended from said yoke,
(d) a block mounted on said rod for vertical sliding movement thereon,
(e) pointer means on said block for use in conjunction with said indicia,
(f) and spring means extending between said yoke and said block for biasing said pointer means toward said flat member.

12. The mitre-guide of claim 11:
(a) wherein said flat member is provided with a plurality of arcuately disposed openings adjacent said face,
(b) and wherein a projection is connected to said block and disposed for entry into a selected opening to lock said yoke at a desired angle.

References Cited

UNITED STATES PATENTS

| | | | |
|---|---|---|---|
| 1,842,630 | 1/1932 | Rodning | 143—6(47) |
| 2,627,287 | 2/1953 | McCluskey | 143—6(43) |
| 2,633,162 | 3/1953 | Neuenschwander | 143—6(43) |
| 2,903,026 | 9/1959 | Frydenlund | 143—6(43) |
| 2,911,017 | 11/1959 | Holder | 143—6(43) |

DONALD R. SCHRAN, *Primary Examiner.*